(12) United States Patent
Gupta et al.

(10) Patent No.: US 10,095,784 B2
(45) Date of Patent: Oct. 9, 2018

(54) SYNONYM GENERATION

(71) Applicant: BloomReach, Inc., Mountain View, CA (US)

(72) Inventors: Apurva Kumar Gupta, Bangalore (IN); Ashutosh Garg, Sunnyvale, CA (US); Antariksh Bothale, Mountain View, CA (US)

(73) Assignee: Bloomreach, Inc., Mountain View, CA (US)

( * ) Notice: Subject to any disclaimer, the term of this patent is extended or adjusted under 35 U.S.C. 154(b) by 296 days.

(21) Appl. No.: 14/740,076

(22) Filed: Jun. 15, 2015

(65) Prior Publication Data

US 2016/0350395 A1    Dec. 1, 2016

Related U.S. Application Data

(60) Provisional application No. 62/168,629, filed on May 29, 2015.

(51) Int. Cl.
*G06F 17/30* (2006.01)
*G06F 17/27* (2006.01)

(52) U.S. Cl.
CPC .... *G06F 17/30737* (2013.01); *G06F 17/2775* (2013.01); *G06F 17/2795* (2013.01)

(58) Field of Classification Search
USPC ........................................................ 707/738
See application file for complete search history.

(56) References Cited

U.S. PATENT DOCUMENTS

| | | | | |
|---|---|---|---|---|
| 6,523,026 | B1 * | 2/2003 | Gillis | G06F 17/30637 |
| 7,043,535 | B2 * | 5/2006 | Chi | G06F 17/30864 |
| | | | | 707/E17.108 |
| 7,251,637 | B1 * | 7/2007 | Caid | G06F 17/30256 |
| | | | | 706/15 |
| 2006/0156222 | A1 * | 7/2006 | Chi | G06F 17/241 |
| | | | | 715/231 |
| 2007/0299862 | A1 * | 12/2007 | Aggarwal | G06F 17/30017 |
| 2009/0327243 | A1 * | 12/2009 | Pradhan | G06F 17/30699 |
| 2010/0306215 | A1 * | 12/2010 | Azar | G06F 17/30731 |
| | | | | 707/759 |
| 2013/0144854 | A1 * | 6/2013 | Pantel | G06F 17/30867 |
| | | | | 707/706 |
| 2014/0067368 | A1 * | 3/2014 | Yih | G06F 17/30672 |
| | | | | 704/9 |
| 2015/0379571 | A1 * | 12/2015 | Grbovic | G06Q 30/0256 |
| | | | | 705/14.54 |
| 2016/0329044 | A1 * | 11/2016 | Cao | G10L 15/063 |

* cited by examiner

*Primary Examiner* — Cam-Linh Nguyen
(74) *Attorney, Agent, or Firm* — Moser Taboada

(57) ABSTRACT

A system for synonym generation and/or identification can be utilized to make a search engine more effective in finding relevant search results. In embodiments, a synonym generation system includes a phrase vector module, a vector similarity module, and a vector filter module. Candidate synonym phrase pairs are selected from data sources for analysis. Data sources may include a log of search queries, a corpus of web text, and a set of merchant descriptions of products. The data sources may be analyzed with respect to the phrase pairs to generate vector representations of the phrase pairs. The vector representations may then be analyzed to determine a similarity vector. The similarity vector allows the synonym generation system to filter synonyms from the candidate phrase pairs.

18 Claims, 4 Drawing Sheets

SYNONYM GENERATION

RELATED APPLICATIONS

This application claims the benefit of U.S. Provisional Application Ser. No. 62/168,629, entitled "Synonym Generation", filed May 29, 2015, the disclosure of which is incorporated by reference herein in its entirety.

BACKGROUND

A common goal amongst search engines software systems is to provide thorough and relevant search results to search queries. Search engine users expect relevant results to their search queries, even if such results do not contain the actual query terms submitted by the search engine user. Because languages can have multiple words with similar meaning, a concept can be described in multiple varying ways, which may result in incongruities between what a searcher enters as a search query and what is on a potentially relevant search result.

Thus, a search engine ideally bridges the gap between language used by searcher and the language used within or in conjunction with a potentially relevant search result. This gap may be bridged by a search engine that incorporates knowledge of synonyms in the language.

However, the meaning of words is often not constant. Any particular word may have multiple dissimilar meanings based on the word's context. Further, the meaning of any particular word may evolve over time. Word meanings can evolve as a result of technological changes, popular culture phenomena, or other developments that result in common and societal linguistic changes. For example, the word "Frozen" has a recently-added definition; that of the name of a popular animated movie. If a search engine only interprets a query for "frozen toys" according to the traditional meaning of "frozen," it is likely that the desired search results will not be returned. As another example, the word "pupil" could signify a student or a part of the eye.

Since many search engines work on exact matching of words queried by the user against words in a document, variations in the spelling and/or form of a word may result in relevant documents being left out of the search results. One example of spelling variation is the difference between "color" and "colour." Examples of differing grammatical forms include pluralization of a term ("shoe" compared to "shoes") and adjective forms of nouns ("magic" compared to "magical"). Common abbreviations may also carry the same or similar meaning and/or understanding as the word for which they stand (for example, "NYC" for "New York City"). Complex synonyms may share meaning with multiple-term phrases (for example, "laptop battery" and "laptop power brick").

Since there are millions of words and phrases in a language, with many of these having various dissimilar meanings based on context, manually building a synonym knowledge database that takes into account these dissimilar meanings can be a daunting and ineffective task. Such a dictionary may involve continuous updating as word meanings change with time and/or as popular culture introduces new interpretations of such words.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
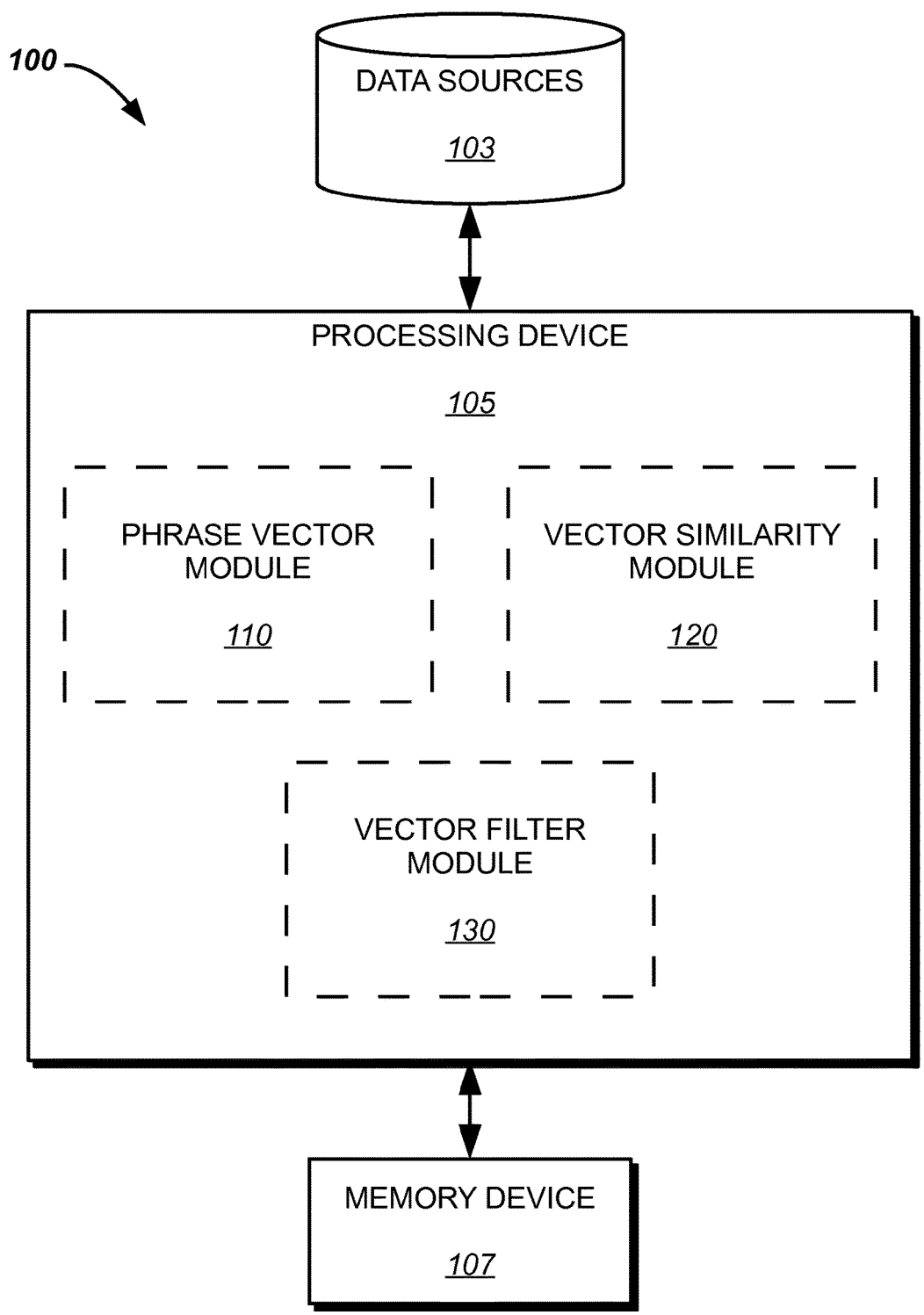
FIG. 1 is a block diagram illustrating a synonym generation system according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for automatically detecting synonyms from various data sources. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit,"

"module," or "system." Furthermore, embodiments of the present disclosure may take the form of a computer program product embodied in any tangible medium of expression having computer-usable program code embodied in the medium.

According to various embodiments of the present disclosure, systems and methods described herein are adapted to automatically generate matched synonym sets from a variety of data sources. According to embodiments, synonyms may be generated according to a variety of methods according to the synonym type, as will be set forth in detail. According to one embodiment, synonym generation may be carried out in three stages. First, phrases are represented as vector data in a mathematical form. Second, similarity between phrase vectors are represented as similarity vector data. Third, filtering is carried out on the similarity vectors to determine synonyms.

FIG. 1 is a block diagram depicting a synonym generation system 100 according to one embodiment of the present disclosure. In an embodiment, synonym generation system 100 includes a processing device 105 and memory device 107. In one embodiment, memory device 107 has computer-readable instructions to direct processing device 105 to include a phrase vector module 110, a vector similarity module 120, and a vector filter module 130. In the illustrated embodiment, synonym generation system 100 further includes data sources 140.

Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In various embodiments, data sources 103 include one or more collections of data that may be utilized to ascertain meaning of various phrases. In embodiments, data sources 103 include data regarding various users' interactions, uses, and/or interpretations of phrases. In embodiments, data sources 103 comprise user-generated textual content having natural language structure.

Various examples of data sources 103 may include logs of aggregated user activity. Such user activity may include various events taking place on web pages or various actions carried out by users. In embodiments, examples of user activity include a user typing a search query in a search bar or a user clicking on a product link or like object.

In embodiments, logs of user activity may include contextual data regarding the user activity, such as what the user looked at prior to clicking on a particular link or what search query a user entered prior to purchasing a product. Such logs may include data regarding virtually every action committed by users within one or more websites.

Various examples of data sources 103 may include a feed. As used herein, the term "feed" may mean a set of documents. In one embodiment, the relevant feed is a set of documents that is indexed by the search engine. In one embodiment where the search engine comprises an e-commerce search engine, the documents in the feed each describe a product or service that is offered for sale.

Embodiments of data sources 103 comprise text data. According to embodiments, text data may include texts created by human beings (in other words, not auto-generated) comprising sentences in natural language structure. In embodiments, text data may be imported from various websites including Twitter, Facebook, Wikipedia, or other sources of human-generated text content.

According to an embodiment, phrase vector module 110 is configured to formulate mathematical representations of various phrases as vectors. In particular embodiments, phrase vector module 110 can utilize one or more methods to generate phrase vectors, as will be set forth in further detail below. In one embodiment, phrase vectors are generated for every phrase found in data sources 103 with respect to other phrases in data sources 103. In another embodiment, phrase vectors are generated for selected phrases. Phrase vector module 110 is adapted to query data sources 103 for logs, feeds, text data, and/or additional data to analyze phrases as described herein.

One illustrative embodiment of phrase vector module 110 is configured to generate phrase vectors that incorporate analysis of terms neighboring the phrase under consideration. In this embodiment, phrase vector module 110 collects terms surrounding a selected phrase from all or a selected portion of data sources 103. These terms that are surrounding a selected phrase may be referred to herein as "neighboring terms." The phrase vector module 110 may count and sort the neighboring terms by their frequency within data sources 103.

In embodiments, phrase vector module 110 can generate a list of frequent neighboring terms around the selected phrase. The list may thus describe the contexts in which the selected phrase occurs. In one embodiment, phrase vector module 110 is configured to extract a probability distribution of neighboring terms around the selected phrase.

For example, a probability distribution of a particular neighboring term $P_2$ occurring adjacently to phrase $P_1$ may be expressed as $P(P_1, P_2)$. The phrase vector for phrase $P_1$ may be expressed as:

$$\text{Rep}(P_1) = P(P_1, P_i) \text{ for all } \{P_i\};$$

where:

$\{P_i\}$ is the set of all phrases in data sources 103;
$P_1$ is the phrase under consideration; and
$\text{Rep}(P_1)$ is the phrase vector for phrase $P_1$.

In one embodiment, to limit the size of $\text{Rep}(P_1)$ to reasonable constraints, a threshold over $P(P_1, P_i)$ is implemented so that rare phrases can be removed from consideration as neighboring terms.

As a person of ordinary skill in the art having the benefit of this disclosure would understand, phrases that have similar meaning may occur in similar contexts. Thus, by comparing the phrase vectors for two phrases (in other words, comparing the contexts for two phrases), a similarity score may be computed, which can provide a quantitative association between two phrases.

One illustrative embodiment of phrase vector module 110 is configured to generate phrase vectors that incorporate analysis of various user actions committed in conjunction with a selected phrase. In particular, each phrase is represented in a phrase vector as a probability distribution of documents that have been viewed, clicked, bought, and/or subject to other types of user actions following entry of a search query containing the phrase under consideration.

In an embodiment, the probability of a particular document $d_1$ being selected after phrase q was queried may be expressed as $P(d_1, q)$. In embodiments, this probability may correspond to some user action, such as clicking a link to the particular document, that was committed directly after q was queried and before any subsequent search query is made. The phrase vector for phrase q may be expressed as:

$$REP(q) = \{P(d_i, q)\} \text{ for all } \{d_i\};$$

where:

$\{d_i\}$ is the set of all feeds and text data in data sources 103;

q is the phrase under consideration or a search query containing the phrase under consideration; and Rep(q) is the phrase vector for phrase q or a search query containing phrase q.

As a person of ordinary skill in the art having the benefit of this disclosure would understand, phrases that have similar meaning may be entered as search queries by users looking for the same or similar feeds. In embodiments, it may be assumed that: (a) search queries which have similar user intent exhibit similar click distributions across feeds in data sources 103; and (b) if two search queries do not exhibit similar user intent, they may not have similar click distributions Thus, by comparing the phrase vectors for two phrases (in other words, comparing the distribution of feeds associated with search queries respectively containing the two phrases), a similarity score may be computed, which can provide a quantitative association between the two phrases.

One illustrative embodiment of phrase vector module 110 is configured to generate phrase vectors that incorporate analysis of representation of a selected phrase within a body of feeds in data sources 103. In one embodiment, phrase vector module 110 calculates a term frequency-inverse document frequency ("tf-idf") vector for all phrases in feeds from data sources 103. Phrase vector module 110 then calculates an average of all tf-idf vectors for each phrase under consideration by averaging the tf-idf vector for each feed in which the phrase appeared, thereby resulting in an average vector representation for the selected phrase with respect to all feeds in data sources 103.

For example, a tf-idf vector for feed $D_1$ may be expressed as:

$$Rep(D_1) = <\text{tf-idf}(P_i)> \text{ for all phrases Pi in } D_1.$$

The phrase vector for phrase $P_1$ may be expressed as:

$$Rep(P_1) = \text{average of } Rep(D_i) \text{ for all } \{D_i\};$$

where:

$\{D_i\}$ is the set of all feeds in data sources 103 where $P_1$ appears;

$P_1$ is the phrase under consideration; and

Rep($P_1$) is the phrase vector for phrase $P_1$.

One illustrative embodiment of phrase vector module 110 is configured to generate phrase vectors that incorporate analysis of appearances of a selected phrase near other phrases in the same user session. In one embodiment, phrase vector module 110 analyzes logs of aggregated user activity at data sources 103 to identify instances where a user queried for the phrase under consideration and queried other phrases in the same session. For example, a probability distribution of a particular phrase $P_2$ occurring in the same session as phrase $P_1$ may be expressed as $P(P_1, P_2)$. The phrase vector for phrase $P_1$ may be expressed as:

$$Rep(P_1) = P(P_1, P_i) \text{ for all } \{P_i\};$$

where:

$\{P_i\}$ is the set of all phrases in data sources 103;

$P_1$ is the phrase under consideration; and

Rep($P_1$) is the phrase vector for phrase $P_1$.

In one embodiment, if two phrases are searched for within the same session, the closeness of the searches is reflected in the phrase vector. For example, if two phrases are searched for one directly after another, the resulting phrase vector would reflect a higher correlation between those phrases than if, for example, the searches were separated by five intervening searches during the session.

It is to be understood that the foregoing methods for generating phrase vectors are provided as examples and not to be taken in a limiting sense. According to various embodiments, phrase vectors for any selected phrase or any selected set of phrases from data sources 103 or other sources depicting a use of such phrase(s) may be generated according to a variety of methods. Such methods may include statistical methods that relate selected phrases to each other or to phrases in various text materials in ways that may indicate a shared meaning or lack of shared meaning Such methods may be currently known in the art or not yet developed. According to embodiments, multiple methods may be carried out by phrase vector module 110 to generate a variety of phrase vectors for each selected phrase. The multiple phrase vectors can each be transmitted to vector similarity module 120 for analysis and processing as described below. In one embodiment, each phrase vector is tagged with the type of phrase vector generation method used.

In one embodiment, phrase vectors are generated by analyzing texts of Internet search engine queries. In another embodiment, phrase vectors are generated by analyzing phrases in dictionaries that have in common neighboring terms. In another embodiment, phrase vector module 110 analyzes one or more graphs showing relationships between words that have shared meaning or other connections. In general, phrase vectors can reflect commonly understood meanings of phrases, including how context can affect the meaning of phrases. Phrase vectors can reflect how a phrase can affect the meaning of other terms around the phrase. A phrase vector can be based on descriptive surroundings of a phrase. In embodiments, phrase vectors can reflect differences between phrases having dissimilar meanings According to an embodiment, vector similarity module 120 is configured to calculate the similarity of phrase vectors generated by phrase vector module 110 using one or more of a variety of similarity measures. As a result of carrying out comparisons between phrase vectors, vector similarity module 120 can output pairs or sets of phrases which exhibit high mutual similarity scores.

In one embodiment where phrase vectors to be analyzed comprise probability distributions, vector similarity module 120 is configured to use methods of statistical analysis that are currently known in the art or yet to be known in the art. Such methods may include Jensen-Shannon divergence, Kullback-Leibler divergence, or other like methods.

In embodiments where phrase vectors comprise tf-idf vectors and/or an average thereof, various similarity measures that are currently known in the art or yet to be known in the art may be employed by vector similarity module 120 to identify similar phrase vectors. In embodiments, such methods include cosine similarity operations. In other embodiments, other like methods may be employed.

In embodiments where phrase vectors comprise sample sets, vector similarity module 120 can use methods of sample set analysis that are currently known in the art or yet to be known in the art. Such methods may include the Jaccard index or other like methods for finding similarities of sample sets.

In an embodiment, vector similarity module 120 analyzes multiple phrase vectors for each phrase according to each method type of phrase vector generation. One embodiment of vector similarity module 120 can read a tag that is associated with the phrase vector that identifies the phrase vector type. Thus, various representations of $P_1$ may be generated by phrase vector module 110 from previous operations.

Where there are multiple phrase vectors for two or more phrases, respectively, vector similarity module 120 can compare multiple dimensions of similarity. For example, a similarity analysis may be carried out on two phrases, which may be referred to as $P_1$ and $P_2$. In one embodiment, the kth representation of $P_1$ may be expressed as $REP_k(P_1)$, while the corresponding similarity (in other words, the kth similarity between $P_1$ and $P_2$) may be expressed as $SIM_k$. In this embodiment, overall similarity vector of $P_1$, $P_2$, which may be referred to herein as a "SIM vector," can be expressed as:

$$SIM(P_1, P_2) = <SIM_1(REP_1(P_1), REP(P_2)), SIM_2(REP_2(P_1), REP_2(P_2)), \ldots, SIM_n(REP_n(P_1), REP_n(P_2))>;$$

where $SIM(P_1,P_2)$ is an n-dimensional vector of real numbers:

$$SIM(P_1, P_2) = <S_1, S_2, \ldots, S_n>.$$

According to this embodiment, if a phrase $P_j$ does not have $REP_k$ defined, $SIM_k(P_j, P_i)$ is undefined for any P, and this element can be marked in the SIM vector as undefined.

Following computation of the SIM vector for a set of vector phrases, vector similarity module 120 can carry out an augmentation phase to enrich the SIM vector as described in the following examples. It is to be understood that the following examples of SIM vector augmentation are provided as examples not to be taken in a limiting sense. Additional embodiments may utilize various other augmentation operations that are known in the art or yet to be known. In general, the augmentation phase enhances the SIM vector computed above with known information inherent to language. For example, it may be known that if a phrase can be obtained from another just by adding a space, these two phrases may be synonyms of each other. Such inherent information can be added to the SIM vector as an extra dimension as will be shown in the following examples.

In one example, vector similarity module 120 may determine that phrases $P_1$ and $P_2$ share the same word stem and/or root form. In embodiments, vector similarity module 120 can utilize a stemming algorithm to identify word stems. In one embodiment, if vector similarity module 120 determines that the phrases under consideration are stem synonyms, a variable stem_score is assigned a "1" value; if no stem synonym is identified, stem_score is assigned a "0" value.

According to one embodiment, vector similarity module 120 may calculate a spelling distance (i.e., edit distance) between phrases $P_1$ and $P_2$. In embodiments, the spelling distance may be assigned as a value to a spelling_score variable.

According to one embodiment, vector similarity module 120 may determine that phrases $P_1$ and $P_2$ are anagrams of each other. If $P_1$ and $P_2$ are anagrams of each, vector similarity module 120 assigns a "1" value to an anagram_score variable; if not, vector similarity module 120 assigns a "0" value to the anagram_score variable.

According to one embodiment, vector similarity module 120 may determine that phrase $P_1$ is a subset of $P_2$. If so, vector similarity module 120 assigns a "1" value to a subset_score variable; if not, vector similarity module 120 assigns a "0" value to the subset_score variable.

According to one embodiment, vector similarity module 120 may determine the gram length for each phrase $P_1$ and phrase $P_2$. The number of tokens can be assigned as a value to a gram_length variable for each respective phrase.

According to one embodiment, vector similarity module 120 may determine that phrase $P_1$ is an abbreviation of $P_2$ or a portion of $P_2$. If so, vector similarity module 120 assigns a "1" value to an abbreviation variable; if not, vector similarity module 120 assigns a "0" value to the abbreviation variable. In embodiments, vector similarity module 120 may utilize various lookup tables and/or dictionaries to determine if phrases are abbreviations of one another. As an example, if phrase $P_1$ is "nyc jackets" and phrase $P_2$ is "new york city jackets," vector similarity module 120 may determine that $P_1$ is an abbreviation of $P_2$.

According to one embodiment, vector similarity module 120 may rank different phrases ($P_i$) for each SIM vector $SIM_k(P_1, P_2)$. Accordingly, each phrase $P_i$ may receive a rank for each similarity vector $SIM_k$ corresponding to phrase $P_1$. The ranks can be appended as a new dimension of $SIM_k$. After these augmentation operations have been carried out, $SIM(P_1,P_2)$ can include the values for one or more of the augmentations, for example:

$$SIM(P_1, P_2) = \{S_1, S_2, \ldots S_n, \text{stem\_score, spelling\_score, } \ldots \text{abbreviation\_score}\}.$$

Additional or alternative augmentation operations may be carried out on the SIM vector. Following augmentation operations, vector similarity module 120 can compare multiple dimensions of similarity for each SIM vector, taking into account the appended augmentations.

As an example of the ranking operation, assume that four phrases ($P_1$, $P_2$, $P_3$, $P_4$) have undergone augmentation operations, resulting in the following $SIM_1$ vectors with respect to $P_1$:

$$SIM_1(REP_1(P_1), REP(P_2))=0.7$$

$$SIM_1(REP_1(P_1), REP(P_3))=0.5$$

$$SIM_1(REP_1(P_1), REP(P_4))=0.01$$

Accordingly, phrases ($P_2$, $P_3$, $P_4$) may be assigned the following ranks in similarity to $P_1$ (ranked from most similar to least similar for representation 1):

$P_2$: 1;
$P_3$: 2; and
$P_4$: 3.

The similarity rankings may then be added as a new dimension to the SIM vector, resulting in the following:

$$SIM(P_1, P_2)=<0.7, \ldots 1>$$

$$SIM(P_1, P_3)=<0.5, \ldots 2>$$

$$SIM(P_1, P_4)=<0.01, \ldots 3>$$

As would be appreciated by a person having ordinary skill in the art, rankings may not necessarily be mutually equivalent. In the example above, 1 is the similarity rank of $P_2$ to $P_1$. However, it is conceivable that the similarity of $P_1$ to $P_2$ could be lower ranked in comparison to the numerical ranking of the similarity of $P_2$ to $P_1$ (in other words, the ranking from $P_1$ to $P_2$ could be expressed as:

$$SIM(P_2, P_1)=<0.7, \ldots 10>.$$

In embodiments, vector filter module 130 is configured to classify each phrase pair into classes that represent the degree of similarity and/or shared meaning (or lack thereof). In one embodiment, the classes are set forth as follows: obvious synonym; $P_1$ synonym of $P_2$; $P_2$ synonym of $P_1$; $P_1$ and $P_2$ strongly related; or $P_1$, $P_2$ unrelated. Various techniques may be carried out to classify each phrase pair.

According to embodiments of vector filter module, several examples of synonym classification schemes may include thresholding. In this embodiment, a predetermined threshold can be selected and compared against each numeric similarity determined by vector similarity module 120. Candidate pairs having a similarity above the threshold may be determined to be synonyms. A threshold for each classification may be set. Adjustment of these thresholds may result in a large number of low confidence synonyms or a small number of high confidence synonyms. The confidence levels can thus be tuned for precision or recall, according to particular circumstances or preference.

Thresholds can be predetermined for any selected dimension. For example, in one embodiment, choosing a high threshold for context similarity and pairs which have stem-similarity as "1" may result in relatively high accuracy for identifying synonymous stem pairs while filtering out stem pairs that are not synonyms. In one embodiment, this configuration correctly determined that "leg" and "leggings" are a stem pair but are not synonyms. Further, this configuration determined that phrase pairs such as "leg" and "legs" are synonyms, as they are both stem-similar and context similar.

According to embodiments, another method for identifying synonyms includes using scores of obvious synonyms to identify related synonyms. For example, if vector filter module 130 found that a phrase is more similar to "shoe" than "shoes," after having already determined that "shoe" and "shoes" constitute an obvious synonym, there is a high probability that the phrase in question will also be a synonym of "shoes."

According to embodiments, if vector filter module 130 observes relatively high mutual similarity rankings between two phrases, then those phrases may be determined to constitute bidirectional synonyms. For example, if $P_1$ and $P_2$ both rank very high in similarity rankings for different rankings with respect to each other, $P_1$ and $P_2$ are strong candidates for being synonyms of each other.

In various embodiments, automated classification may be utilized to classify phrase pairs. Since each phrase pair has been defined as a SIM vector, supervised learning models such as decision trees, support vector machines ("SVM"), and the like may be utilized to classify phrase pairs into one of the foregoing classes. According to one embodiment, a random set of training examples constituting known synonymous pairs are labeled into the synonym classes training the classifier(s). Following training, the trained classifier may be fed SIM vectors for unclassified phrase pairs and then classify these phrase pairs into the classes.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 2:
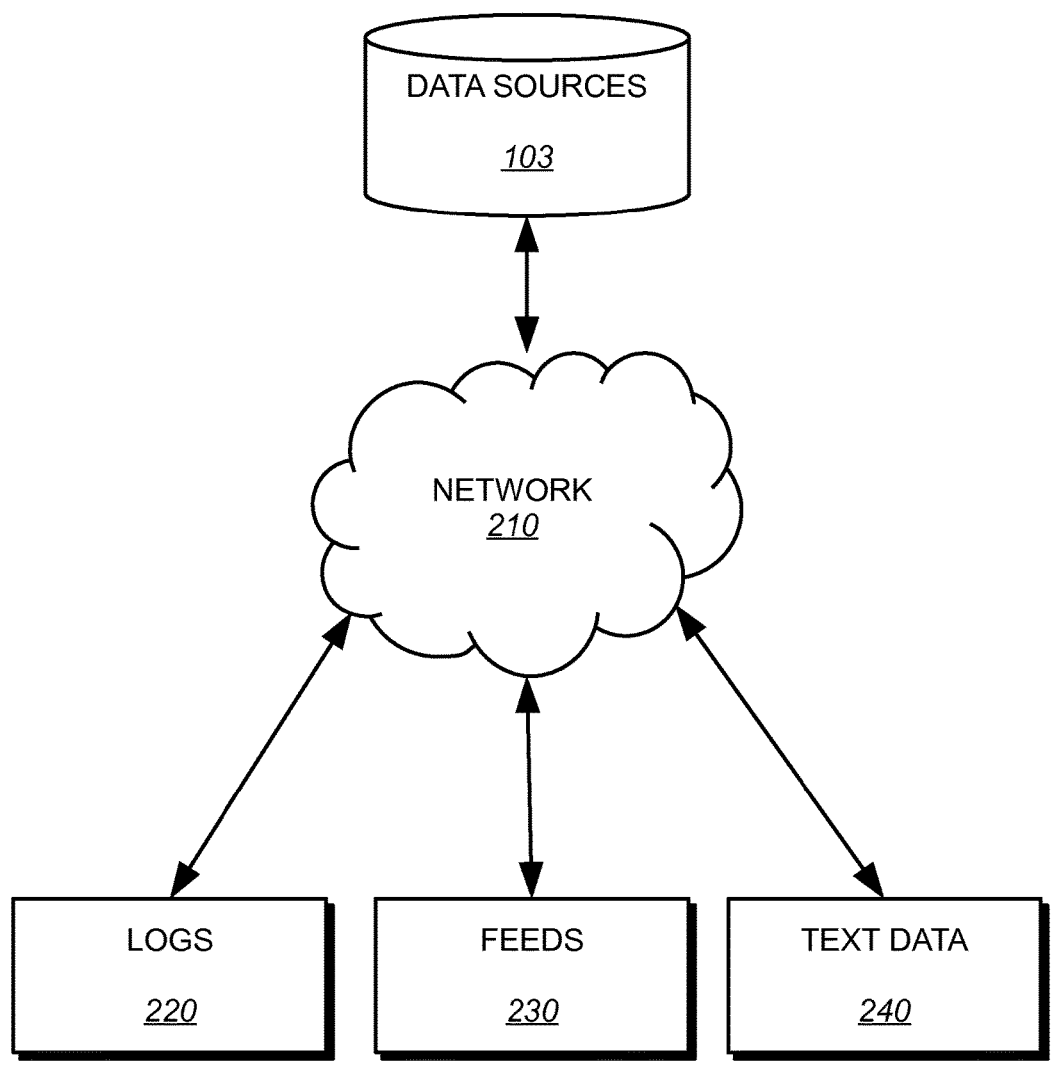
FIG. 2 is a schematic illustrating data sources according to one embodiment of the present disclosure.

FIG. 2 is an example schematic illustrating data sources 103 according to embodiments of the present disclosure. According to the embodiment depicted in FIG. 2, data sources 103 is adapted to communicate with sources of logs 220, feeds 230, and text data 240 via network 210. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof. According to various embodiments of the present disclosure, logs 220, feeds 230, and text data 240 may be found on a variety of local or remote servers or other computers, including public-facing webpages, private databases containing logs of user and/or customer behavior, internal product databases, and other like databases.

Figure 3:
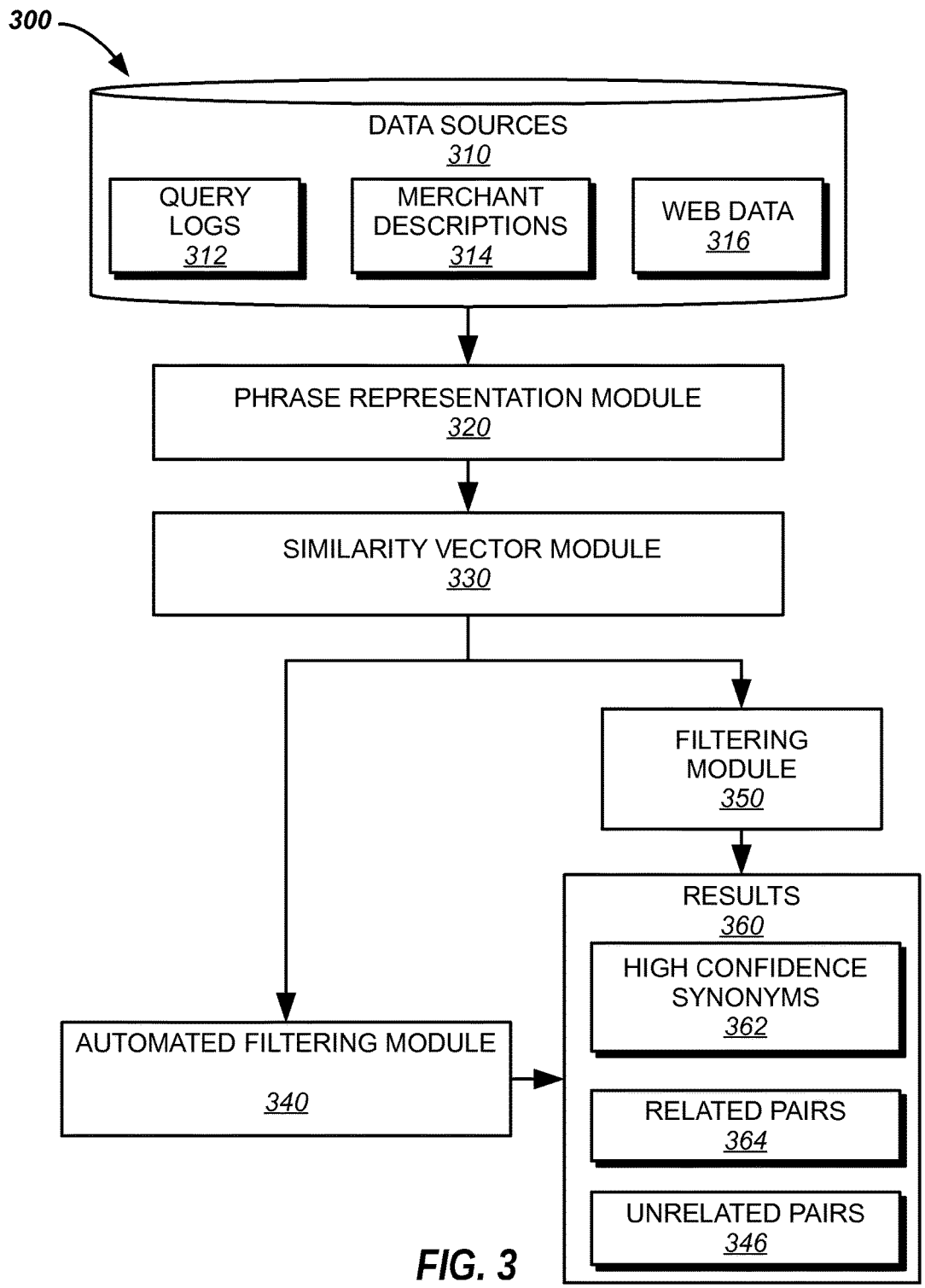
FIG. 3 is a block diagram illustrating a synonym generation method according to one embodiment of the present disclosure.

In operation, embodiments of the present disclosure may automatically generate matched synonym sets from a variety of data sources. Referring now to FIG. 3, an abstracted representation of a system for synonym generation 300 is depicted according to one embodiment of the present disclosure. In the embodiment depicted, data sources 310 comprise query logs 312, merchant descriptions 314, and web data 316. Phrase representation module 320 is adapted to generate a vector representation of each selected phrase with one or more candidate phrase pairs as described above. Similarity vector module 330 is adapted to calculate similarity of phrase vectors generated by phrase representation module 320 according to a variety of similarity measures set forth above. Auto filtering module 340 is adapted to automatically classify the resultant similarity vectors into various classifications, which filtering module 350 is adapted to sort similarity vectors according to predetermined thresholds into the classifications. The classifications of results 360 include high confidence synonyms 362, related pairs 364, and unrelated pairs 346.

Figure 4:
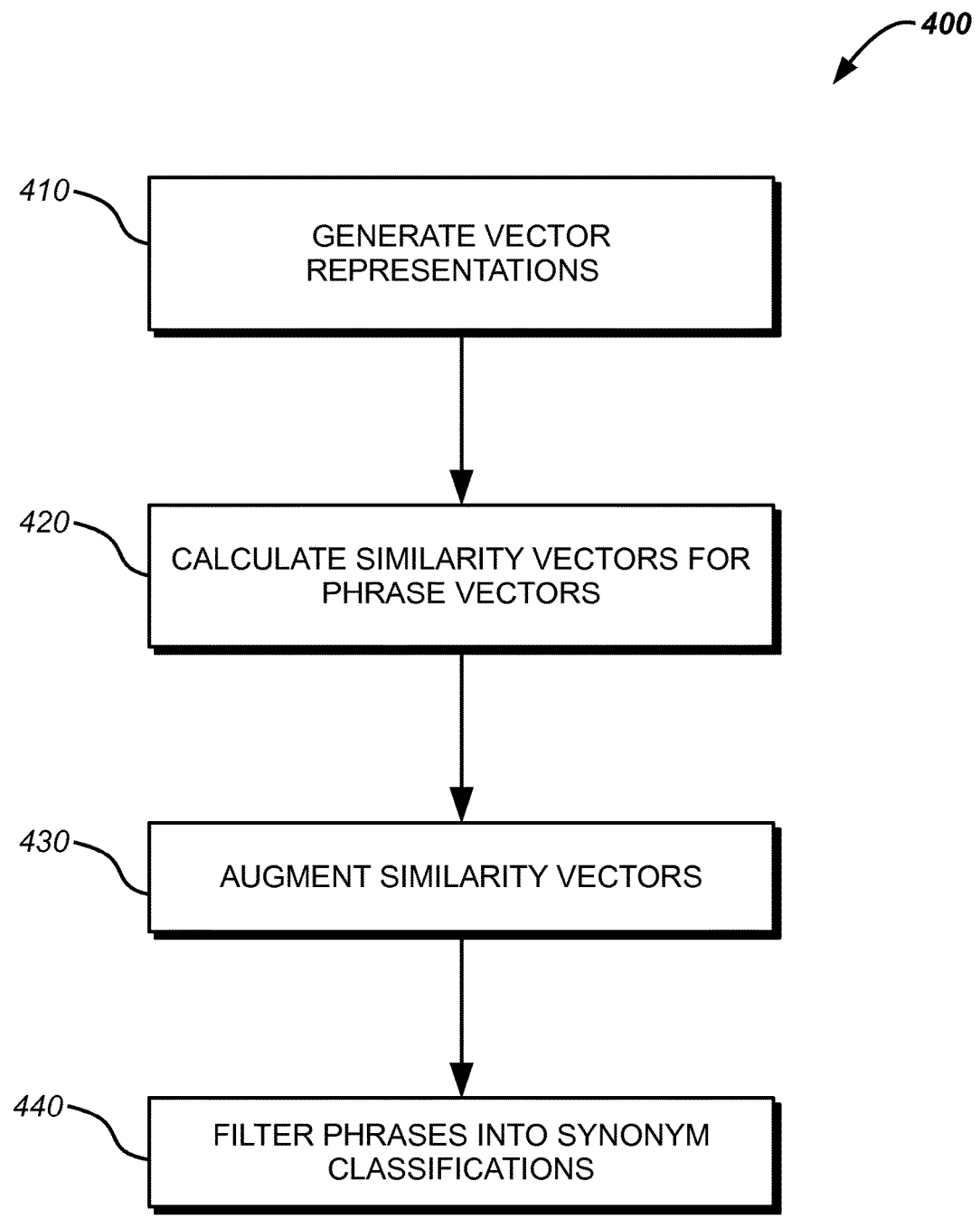
FIG. 4 is a flow-chart illustration of a method of synonym generation according to one embodiment of the present disclosure.

Referring now to FIG. 4, Method 400 begins at GENERATE VECTOR REPRESENTATIONS 410. At operation 410, candidate phrase pairs are analyzed from data sources such as query logs, merchant descriptions, and/or text from web data to generate a vector representation for selected phrase with respect to the candidate phrase pair.

At CALCULATE SIMILARITY VECTORS FOR PHRASE VECTOR REPRESENTATIONS 420, similarities between phrase vectors are calculated to result in pairs of phrases having high similarity scores. In embodiments, the similarity vectors comprise an n-dimensional vector of real numbers that represents the similarity of one phrase with respect to another phrase.

At AUGMENT SIMILARITY VECTORS 430, additional dimensions may be appended to the similarity vectors to take advantage of particular intrinsic language features. In embodiments, similarity from a selected phrase with respect to another phrase may receive a ranking, which may be appended to the similarity vectors.

At FILTER INTO SYNONYM CLASSIFICATIONS 440, various dimensions of similarity vectors are compared to determine if the phrase pairs constitute a synonym. Various stratifications may be utilized. In one example, the phrase pairs are classified into the following classifications: "High Confidence Synonyms," "Related Pairs," and "Unrelated Pairs." In another embodiment, the phrase pairs ($P_1$, $P_2$) are classified into the following classifications: "obvious synonym;" "$P_1$ synonym of $P_2$;" "$P_2$ synonym of $P_1$;" "$P_1$ and $P_2$ strongly related;" or "$P_1$, $P_2$ unrelated."

In one embodiment, at operation 440, candidate synonym pairs may be classified by automated classification via, for example, supervised learning models.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for generating synonym pairs, comprising:
   retrieving one or more data sources containing at least a first phrase and a second phrase;
   generating a first vector representation of the first phrase, wherein the first vector representation of the first phrase incorporates a probability distribution within the data sources of user actions made in connection with the first phrase;
   generating a second vector representation of the second phrase, wherein the second vector representation of the second phrase incorporates a probability distribution within the data sources of user actions made in connection with the second phrase;
   determining at least one similarity score for the second vector representation with respect to the first vector representation;
   generating a similarity vector comprising the at least one similarity score by generating an n-dimensional vector of real numbers that represents a multi-dimensional similarity between the first phrase and the second phrase;
   filtering the first phrase and the second phrase into synonym classifications by comparing one or more components of the similarity vector against a number threshold; and
   reporting whether the first phrase and the second phrase constitute a synonym pair.

2. The method of claim 1, wherein the data sources comprise a log of search queries, a corpus of web text, and a set of merchant descriptions of products.

3. The method claim 1, wherein the first vector representation of the first phrase incorporates a probability distribution within the data sources of a neighboring term with respect to the first phrase.

4. The method claim 1, wherein the first vector representation of the first phrase incorporates a term frequency-inverse document frequency average with respect to the first phrase within a corpus of web text.

5. The method of claim 1, wherein generating the similarity vector further comprises appending a dimension to the similarity vector.

6. The method of claim 5, wherein appending the dimension to the similarity vector comprises calculating a stem score.

7. The method of claim 5, wherein appending the dimension to the similarity vector comprises calculating a spelling distance score.

8. The method of claim 5, wherein appending the dimension to the similarity vector comprises determining if the first phrase is an abbreviation of the second phrase.

9. The method of claim 1, wherein filtering the first phrase and the second phrase based on the similarity vector comprises receiving a set of training examples constituting known synonymous pairs.

10. A computer-implemented method for generating synonym pairs, comprising:
    generating a first vector representation and a second vector representation of a first phrase and a second phrase, respectively, wherein the first vector representation of the first phrase incorporates a probability distribution of user actions made in connection with the first phrase and the second vector representation of the second phrase incorporates a probability distribution of user actions made in connection with the second phrase;
    calculating a similarity vector comprising a similarity score that represents a similarity between the first vector representation and the second vector representation, the similarity vector being an n-dimensional vector of real numbers that represents a multi-dimensional similarity between the first phrase and the second phrase;
    determining whether the first phrase and the second phrase are a synonym pair by comparing one or more components of the similarity vector against a number threshold; and if the first phrase and the second phrase constitute a synonym pair, reporting that the first phrase and the second phrase constitute the synonym pair.

11. The method of claim 10, wherein the first phrase and the second phrase are retrieved from one or more data sources.

12. The method of claim 11, wherein the data sources comprise a log of search queries, a corpus of web text, and a set of merchant descriptions of products.

13. The method of claim 11, wherein the first vector representation of the first phrase incorporates a probability distribution of a neighboring term with respect to the first phrase.

14. The method of claim 11, wherein the first vector representation of the first phrase incorporates a term frequency inverse document frequency average with respect to the first phrase within a corpus of web text.

15. The method of claim 10, wherein calculating a similarity vector for the first vector representation comprises appending a dimension to the similarity vector.

16. The method of claim 10, wherein determining whether the first phrase and the second phrase are a synonym pair comprises receiving set of training examples constituting known synonymous pairs.

17. A computer system for generating synonym pairs comprising:
   a synonym generation computer device comprising a memory and a processing device, the memory storing computer-readable instructions directing the processing device to:
      retrieve one or more data sources containing at least a first phrase and a second phrase;
      generate a first vector representation of the first phrase, wherein the first vector representation of the first phrase incorporates a probability distribution of user actions made in connection with the first phrase;
      generate a second vector representation of the second phrase, wherein the second vector representation of the second phrase incorporates a probability distribution of user actions made in connection with the second phrase;
      determine at least one similarity score for the second vector representation with respect to the first vector representation;
      generate a similarity vector comprising the at least one similarity score by generating an n-dimensional vector of real numbers that represents a multi-dimensional similarity between the first phrase and the second phrase;
      filter the first phrase and the second phrase by comparing one or more components of the similarity vector against a number threshold; and
      report whether the first phrase and the second phrase constitute a synonym pair.

18. The system of claim 17, wherein the one or more data sources comprise a log of search queries, a corpus of web text, and a set of merchant descriptions of products.

* * * * *